United States Patent [19]

McBride et al.

[11] Patent Number: 5,239,649
[45] Date of Patent: Aug. 24, 1993

[54] CHANNEL PATH LOAD BALANCING, THROUGH SELECTION OF STORAGE VOLUMES TO BE PROCESSED, FOR LONG RUNNING APPLICATIONS

[75] Inventors: Gregory E. McBride; Jerry W. Pence; David G. Van Hise, all of Tucson, Ariz.

[73] Assignee: International Business Machines Corporation, Armonk, N.Y.

[21] Appl. No.: 428,542

[22] Filed: Oct. 30, 1989

[51] Int. Cl.$^5$ .................................... G06F 13/14
[52] U.S. Cl. .................... 395/650; 364/241.9; 364/243.1; 364/243.0; 364/281.8; 364/281.6; 364/281; 364/281.3; 364/DIG. 2
[58] Field of Search ... 364/200 MS File, 900 MS File; 395/600, 650

[56] References Cited

U.S. PATENT DOCUMENTS

| | | | |
|---|---|---|---|
| 3,588,837 | 6/1971 | Rash et al. | 340/172.5 |
| 3,648,825 | 3/1972 | Mullery et al. | 340/172.5 |
| 4,032,899 | 6/1977 | Jenny et al. | 364/200 |
| 4,262,331 | 4/1981 | Freeland et al. | 364/200 |
| 4,403,286 | 9/1983 | Fry et al. | 364/200 |
| 4,435,755 | 3/1984 | Meritt | 364/200 |
| 4,577,272 | 3/1986 | Ballew et al. | 364/200 |
| 4,633,387 | 12/1986 | Hartung et al. | 364/200 |
| 4,638,424 | 1/1987 | Beglin et al. | 364/200 |
| 4,748,558 | 5/1988 | Hirosawa et al. | 364/200 |
| 4,771,375 | 9/1988 | Beglin et al. | 364/200 |
| 4,920,487 | 4/1990 | Baffes | 364/300 |
| 5,031,089 | 7/1991 | Liu et al. | 364/200 |
| 5,053,950 | 10/1991 | Naganuma et al. | 364/200 |

OTHER PUBLICATIONS

IBM Technical Disclosure Bulletin, "Load Balancing Control for MultiProcessors", vol. 20, No. 3, Aug. 1977, pp. 937-938.
IBM Technical Disclosure Bulleting, "Input/Output Channel/Device Load Balancing Algorithm", vol. 14, No. 11, Apr., 1972, pp. 3458-3459.
IBM Technical Disclosure Bulletin, "Load Balancing Buffered Peripheral Subsystem", vol. 24, No. 1B, Jun., 1981, pp. 707-709.
Data facility Hierarchical Storage Manager Version 2 Release 4.0, "System Programmer's Guide" IBM Manual SH35-0085-3.
IBM Manual SH35-0083-3, Data Facility Hierarchical Storage Manager Version 2 Release 4.0, "System Programmers Command Reference".
IBM Manual LY35-0098-1, Data Facility Hierarchical Storage Manager Version 2 Release 4.0, "Diagnosis Guide".
IBM Manual SH35-0093-3, Data Facility Hierarchical Storage Manager Version 2 Release 4.0, "User's Guide".
IBM Manual SC26-4388-00, Data Facility Data Set Services Version 2 Release 4, "User's Guide".
IBM Manual LY27-9538-01, Data Facility Data Set Services Version 2 Release 4, "Diagnosis Guide".

*Primary Examiner*—Thomas C. Lee
*Assistant Examiner*—Maria N. Van Buhr
*Attorney, Agent, or Firm*—M. W. Schecter

[57] ABSTRACT

A system for balancing the loads on channel paths in a digital computer during long running applications is disclosed. Only the load associated with relatively long running applications is monitored. For each volume of data eligible for processing, the selection of volumes is first made from those having affinity to the calling host. The load across the respective connected channel paths is calculated. The calculation is weighted to account for the different magnitudes of load resulting from different applications and to prefer the selection of volumes connected to the fewest unused channel paths such that processing of the selected volume will maintain the maximum number of unused channel paths. The optimal volume is selected as the next volume to be processed. The monitored load on each channel path is then updated to include the load associated with the newly selected volume, assuming that the load associated with processing the volume is distributed evenly across the respective connected channel paths. The selection of the following volume is then based on the updated load information and the method continues cyclically during subsequent selection of the remaining volumes for processing.

16 Claims, 5 Drawing Sheets

CHANNEL PATH LOAD BALANCING, THROUGH SELECTION OF STORAGE VOLUMES TO BE PROCESSED, FOR LONG RUNNING APPLICATIONS

BACKGROUND OF THE INVENTION

1. Field of the Invention

The present invention relates to a program and method for balancing the loads on channel paths in a digital computer. More particularly, the invention relates to a program and method for balancing the loads on channel paths in a digital computer during long running applications.

2. Discussion of the Related Art

Modern computers require a host processor including one or more central processing units and a memory facility. The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of a computer system.

Because today's computers require large quantities of data storage capacity, computer memory is available in many forms. A fast but expensive form of memory is main memory, typically comprised of microchips. Other available forms of memory are known as peripheral storage devices and include magnetic direct access storage devices (DASD), magnetic tape storage devices, optical recording devices, and magnetic or optical mass storage libraries. Each of these other types of memory has a greater storage density and thus lower cost than main memory. However, these other memory devices do not provide the performance provided by main memory. For example, the time required to properly position the tape or disk beneath the read/write mechanism of the drive cannot compare with the rapid, purely electronic data transfer rate of main memory. It is inefficient to store all of the data in a computer system on but a single type of memory device. Storing all of the data in main memory is too costly and storing all of the data on one of the peripheral storage devices reduces performance.

A typical computer system includes both main memory and one or more types of peripheral storage devices arranged in a data storage hierarchy. The data storage hierarchy arrangement is tailored to the performance and cost requirements of the user. In such a hierarchy, main memory is often referred to as primary data storage, the next level of the hierarchy is often to referred to as secondary data storage, and so on. Generally, the highest level of the hierarchy has the lowest storage density capability, highest performance and highest cost. As one proceeds down through the hierarchy, storage density generally increases, performance generally decreases, and cost generally decreases. By transferring data between different levels of the hierarchy as required, the cost of memory is minimized and performance is maximized. Data is thus stored in main memory only so long as it is expected to be required by the processor. The hierarchy may take many forms, include any number of data storage or memory levels, and may be able to transfer data directly between any two distinct memory levels. The transfer of data may employ I/O channels, controllers, or cache memories as is well known in the art.

In a typical computer using main memory as primary data storage and peripheral storage devices as secondary data storage, the processor can only access data for executing instructions if the data is stored in main memory. If work to be done by the processor requires data not then stored in main memory, the processor will recall or promote data from the peripheral storage device to main memory. A processor may recall data simply to access or change that data, or for other reasons, such as data storage management. Examples of data storage management include the migration of data to a lower level of the data storage hierarchy and the copying of a data set to create a "backup" copy of that data set. Access to the data occurs using one or more channel paths connected between the processor and the peripheral storage device.

Generally, it is desirable to distribute the load of data transfers across the channel paths (such distribution is hereinafter known as "balancing") to promote efficient operations. For example, it would not be efficient to perform the aforementioned data transfers using but one of a plurality of available channel paths. The one, utilized channel path would be unduly loaded while the remaining available channel paths would be wasted. In addition, a malfunction of the utilized channel path could result in a significant delay in processing. By dividing the load across the channel paths processing is accomplished with less load per channel path and the significance of any single channel path malfunction is reduced.

Several techniques are known for balancing the use of resources in a data processing system. Such balancing among resources is usually achieved at task assignment time. That is, before any processing ensues a control mechanism determines which resource should handle the task. Examples of such task assignment balancing are found in the IBM Technical Disclosure Bulletin, Vol. 20, No. 3, August, 1977, pp 937-38, the IBM Technical Disclosure Bulletin, Vol. 14, No. 11, April, 1972, pp. 3458-3459, U.S. Pat. No. 3,648,253 and U.S. Pat. No. 4,032,899.

Load balancing may be enhanced by monitoring the activity of system resources. The monitoring of resources permits the system to subsequently re-allocate the use of such resources. Typically, resource activity is monitored for a period of time to determine which resources are overutilized and which resources are underutilized. Load balancing is then achieved during the subsequent assignment of tasks. An example of such monitoring is found in IBM Technical Disclosure Bulletin, Vol. 24, No. 1B, June, 1981, pp. 707-09 and U.S. Pat. No. 3,588,837.

Not all load balancing is achieved at task assignment time. By monitoring resources after task assignment, as previously described, dynamic load balancing is achieved. Tasks causing the overutilization of a particular resource are discontinued or re-assigned to other resources. An example of such load balancing is found in IBM Technical Disclosure Bulletin, Vol. 24, No. 3, August, 1981, page 1411. U.S. Pat. No. 4,633,387 discloses a system in which resources monitor themselves. A least busy resource requests work from a busier resource when its work falls below a threshold level. The busier resource then supplies work to the requesting unit to balance the respective loads.

The aforementioned methods of load balancing do not achieve such over a prolonged duration. This is the result of a failure to account for the duration of a load associated with the assignment of a task or a failure to anticipate load duration during the monitoring of resources. There is little advantage to assigning a task to a resource having low activity if the task is of short duration. During processing of such a task, other tasks of longer duration may be assigned to otherwise (not including the assigned task of short duration) more active resources, thereby resulting in short term load balancing and long term load unbalancing. Similarly, the expected duration of different resource activities should be monitored, not just their peak or average load.

The aforementioned methods also fail to account for certain situations actually requiring some degree of load unbalancing. Resources connected to devices having affinity to a certain host for processing should be selected for processing on that host before resources which can be processed by any host. Also, if the availability of resources to some extent depends on their lack of use, it may be desirable to allocate such resources so as to maintain that lack of use. Finally, load balancing should account for system connections to maintain maximum availability of resources connected to the most system devices.

SUMMARY OF THE INVENTION

The primary object of the present invention is an improved program and method for balancing the loads on resources in digital computers.

Another object of the invention is a program and method for balancing the loads on resources by the order of selection of volumes for processing.

Yet another object of the invention is a program and method for balancing the loads on resources which anticipates such loads for relatively long durations.

Yet another object of the invention is a program and method for balancing the loads on resources which accounts for the affinity of devices connected to those resources to certain hosts.

Yet another object of the invention is a program and method for balancing the loads on resources which accounts for the need to maintain the availability of certain resources for processing.

These and other objects are accomplished by a program and method for balancing the loads on channel paths during long running applications. Only the load associated with relatively long running applications is monitored. For each volume of data eligible for processing, the selection of volumes is first made from those having affinity to the calling host. For such volumes, a representative average load across the respective connected channel paths is calculated. The calculation is weighted to account for the different magnitudes of load resulting from different applications and to prefer the selection of volumes connected to the fewest unused channel paths such that actual processing of the selected volume will maintain the maximum number of unused channel paths. The optimal volume is selected as the next volume to be processed. If two or more volumes are of equal preference, the volume connected to the fewest number of channel paths is selected. The monitored load on each channel path is then updated to include the load associated with the newly selected volume, assuming that the load associated with processing the volume is distributed evenly across the respective connected channel paths. The selection of the following volume is then based on the updated load information and the method continues cyclically for the subsequent selection of the remaining volumes for processing.

The foregoing and other objects, features and advantages of the invention will be apparent from the following, more particular description of the preferred embodiments of the invention as illustrated in the accompanying drawing.

DETAILED DESCRIPTION OF THE PREFERRED EMBODIMENT

Referring now more particularly to the drawing, like numerals denote like features and structural elements in the various figures. The invention will be described as practiced in a multi-host processor data processing environment having a plurality of peripheral data storage devices of diverse types and capabilities. It should be understood that the invention may also be practiced in a single-host processor environment having a smaller number of peripheral data storage devices, or with a variety of different system structures.

Figure 1:
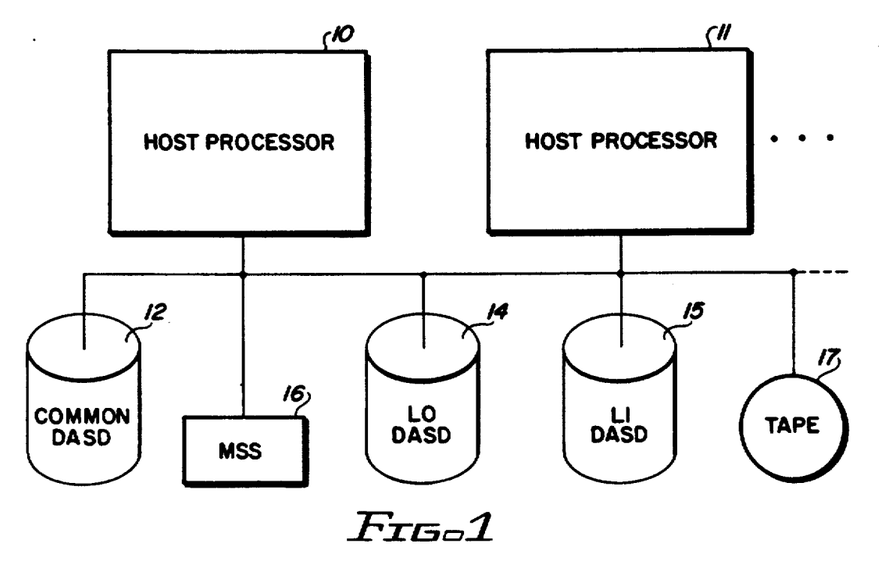
FIG. 1 is a general schematic of a data storage hierarchy in which the invention may be used.

Referring to FIG. 1, a data storage hierarchy in a multi-host environment will now be described. The system includes two or more host processors, a host processor 10 and a host processor 11 being shown in the figure, each of which includes the usual component portions of a host processor, such as the arithmetic logic unit, main memory, and input/output channels (not identified in FIG. 1). Each host processor can be either a uni-processor or a multi-processor. The host processors employ various operating systems not pertinent to an understanding of the present invention. An example of a host processor which may be used in the data storage hierarchy shown is the IBM 3090 mainframe computer. Within each host processor is a computer program employing the invention, as will be detailed.

Host processors 10 and 11 are connected to a common DASD 12. Common DASD (direct access storage device) 12 consists of a high performance disk-type data storage device. Stored in common DASD 12 are those control data structures (not shown) desired for coordinating operations of host processors 10 and 11 in executing a data storage management program. A high performance DASD 14 labeled L0 DASD, stores those data sets directly accessed by host processors 10 and 11 and receives data sets for storage generated by host processors 10 and 11. A lower performance DASD 15, labeled L1 DASD, stores those data sets accessed by host processors 10 and 11 less frequently than those stored on high performance DASD 14. When the data sets stored in DASD 14 become aged through non-access by host processors 10 and 11 the data storage management program automatically moves data sets from DASD 14 to DASD 15 such that data set access by host processors 10 and 11 is enhanced by keeping only those data sets that are frequently accessed by the host processors in DASD 14. DASDs 14 and 15 represent the first two levels of a data storage hierarchy created by the data storage management program. An example of a DASD storage which may be used in the data storage hierarchy shown is the IBM 3380 DASD. Each DASD is said to store a volume of data.

A still lower level in the data storage hierarchy is represented by a mass storage system (MSS) 16, labeled MSS, and a tape drive 17, labeled TAPE. MSS 16 and DASDs 12, 14 and 15 provide for automatic accessing of all data sets stored therein. MSS 16 includes one or more means for reading and writing to recording media and automated means for transferring such media between storage cells located in MSS 16 and the means for reading and writing. The recording media may be magnetic tape, magnetic disk, or optical disk and the means for reading and writing may be tape drives or magnetic or optical disk drives as the case may be. MSS 16 may also include means for inserting or removing recording media therein. An example of a MSS which may be used in the data storage hierarchy shown is the IBM 3850 MSS. Tape drive 17 is used for archival or other long term data storage, backup and the like that is unlikely to be accessed and usually require operator intervention for mounting and demounting tapes. An example of a tape drive which may be used in the data storage hierarchy shown is an IBM 3480 magnetic tape drive. The system operator and system console is not shown in FIG. 1 for the purpose of simplification.

In the data storage hierarchy shown, the dotted and dashed lines represent the possibility of additional system components. Several host processors could be connected substantially as shown to several data storage devices at each level of the hierarchy. The ability to add additional system components is limited only by the connectivity of each component. For simplicity, components between the levels of the data storage hierarchy, such as channels and control units, are not shown in FIG. 1.

Figure 2:
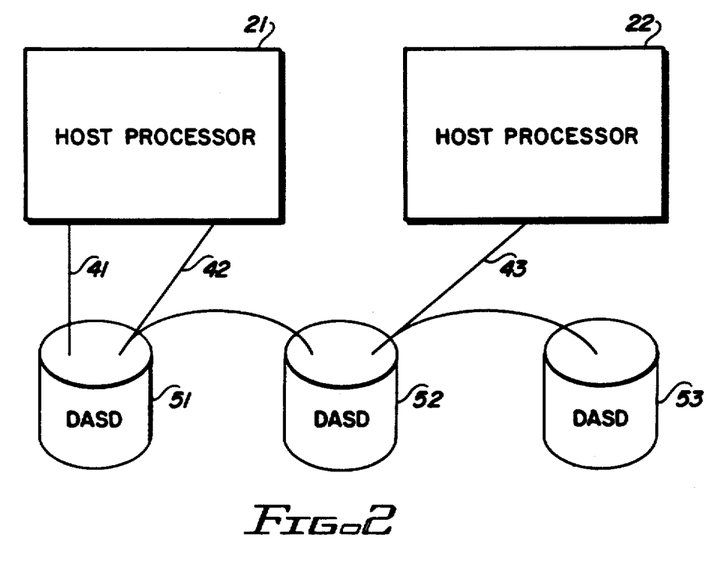
FIG. 2 is a schematic of the relevant parts of a sample data storage hierarchy.

Referring to FIG. 2, a sample configuration of a data storage hierarchy in which the invention can be used will be described. Host processors 21 and 22 are connected to DASDs 51-53. As compared to FIG. 1, DASDs 51-53 each correspond to a different L0 DASD 14. Host processors 21 and 22 are connected to DASDs 51-53 via channel paths 41-43. Channel path 41 connects host processor 21 and DASD 51. Channel path 42 connects host processor 21 with DASD 51 and DASD 52. Channel path 43 connects host processor 22 with DASD 52 and with DASD 53. Each of these connections are well known in the art, as practiced, for example, in the IBM mainframe environment. DASDs 51-53 each contain a volume of data hereinafter referred to as volumes 51-53.

In the preferred embodiment, the computer program including the invention is included in Data Facility Hierarchical Storage Manager (DFHSM), a storage management data facility in the Multiple Virtual Storage (MVS) operating system environment. A general description of DFHSM may be found in U.S. Pat. Nos. 4,771,375 and 4,638,424; IBM Manual SH35-0085-3, DATA FACILITY HIERARCHICAL STORAGE MANAGER VERSION 2 RELEASE 4.0, "System Programmer's Guide"; IBM Manual SH35-0083-3, DATA FACILITY HIERARCHICAL STORAGE MANAGER VERSION 2 RELEASE 4.0, "System Programmer's Command Reference"; and IBM Manual LY35-0098-1, DATA FACILITY HIERARCHICAL STORAGE MANAGER VERSION 2 RELEASE 4.0, "Diagnosis Guide"; and IBM Manual SH35-0093-3, DATA FACILITY HIERARCHICAL STORAGE MANAGER VERSION 2 RELEASE 4.0, "User's Guide". DFHSM is a continuously running application program and includes instructions residing in the host processors. DFHSM is part of Data Facility System Managed Storage (DFSMS), which includes other facilities working together with or independently of DFHSM, such as Storage Management Subsystem (SMS), and Data Facility Data Set Services (DFDSS), described in IBM Manual SC26-4388-00, DATA FACILITY DATA SET SERVICES, "User's Guide" VERSION 2 RELEASE 4 and IBM Manual LY27-9538-01, DATA FACILITY DATA SET SERVICES, "Diagnosis Guide" VERSION 2 RELEASE 4. All of the aforementioned patents and documents are hereby incorporated by reference.

Without DFSMS, the management of data is somewhat manually oriented. Management criteria are selected at the time of volume identification or definition to DFHSM (ADDVOL). With DFSMS, criteria are specified once (unless changed at a later time) and apply to all SMS data. Even where SMS is used, data may or may not be managed by SMS. DFDSS may or may not be used by DFHSM to move such data. With either type of data, DFHSM is used to manage the data (i.e. with SMS data, DFHSM may defer to DFDSS for the actual movement of data).

Storage management by DFHSM includes applications (or functions) for data processing system space management and availability management. Space management applications include data set migration and recall. Data set migration (which can be performed at one or more intervals, such as hourly and daily) is the movement of a data set to a relatively lower level of the data storage hierarchy; recall is the movement of a data set to a relatively higher level of the data storage hierarchy. Space management is used to maintain data sets at a level of the data storage hierarchy corresponding to their frequency access. Availability management applications include incremental backup, full volume dump, and recovery. Incremental backup is the copying of recently modified data sets into a relatively lower level of the data storage hierarchy; full volume dump is similar to incremental backup but relates to entire volumes and data is moved only by DFDSS. Recovery is the copying of a backup version or dump copy of a data set or volume to a relatively higher level of the data storage hierarchy. Backup and dump are used to ensure the availability of particularly important data, recovery is used when the primary copy of the data becomes unavailable. Each of the applications performs according to predetermined or user specified criteria, as are well known in the art. For example, all data sets may be migrated a particular period of time after last being referenced in DASD 14.

DFHSM typically operates during periods of low system activity so as to minimize interference with other processing, yet consumes a large amount of resources is are relatively long running in nature. For example, migration, incremental backup, and full volume dump are long running applications typically requiring 6-30 minutes for each volume to complete. These applications are long running because of the time required to identify and then act upon certain data sets only, and because of the potentially massive amount of data in a volume for a dump. Recall and recovery are short running applications typically requiring only 4-15 seconds because identification of the data has already occurred and only one data set is processed. Each application is accomplished in one or more tasks. A task is the operation of an application on a specific data volume. For example, a single task would do the identification and actual movement of all data sets requiring migration in a single volume. A volume may be processed via multi-tasking, as is known in the art. As volumes are identified they are selected for processing in a specific order. Thus, volumes of data are selected for processing and result in a load on the channel paths to which they are connected. It is this load which is balanced (i.e. distributed) to enhance performance.

Prior to DFSMS, the order of processing volumes of data could be manually controlled with the expectation of balancing the load across the channel paths of each host processor. Further, the customer had to specify on which host the volume was to be processed. The order of processing was done by user prioritization at the time of volume insertion (ADDVOL). The order of processing volumes was the same as that of volume definition. Under DFSMS constraints, the information received at volume definition (for volumes managed by SMS) is no longer visible to DFHSM. Load balancing of SMS volumes must therefore occur through some other means. Volumes may exist in a data storage hierarchy, some of which are SMS managed and some of which are not SMS managed. The invention will thus be described as a method for machine-managed load balancing during DFHSM processing of volumes, the SMS volumes being prioritized for selection by means other than manually at volume insertion. Non-SMS volumes are described as continuing to be prioritized manually to achieve load balancing.

Load balancing is achieved by monitoring the load associated with long running DFHSM volume processing only (i.e. long running DFHSM applications). The load from other applications, DFHSM or otherwise, is ignored as it cannot be trusted to be a reliable indication of the sustained load on any particular channel for more than a short duration (i.e. seconds) whereas the load associated with DFHSM volume processing is of projected duration (i.e. minutes). Thus, hereinafter, "load" refers to that resulting from long running applications of DFHSM only. In addition, the selection of volumes according to the invention is made during the processing of long running applications only. The load balancing of other relatively short running applications is unnecessary as the load resulting from such applications is of shorter duration and therefore of less significance.

Two significant data structures are the mounted volume table (MVT) and the current channel load control block (CCL).

These structures are not shown in FIGS. 1-2 for simplicity, but exist for each host in their respective main memories. An MVT exists for each volume considered for processing in each respective host, indicating certain information about that volume. The entries are chained together by pointers to create two distinct chains of information, one for SMS managed volumes, and one for non-SMS managed volumes. Fields in an MVT entry indicate the channel paths connected to the host to which the volume is connected (CHPID), which long running DFHSM applications the volume is eligible to be processed for, whether the volume has affinity to the host for each application, whether the volume has already been selected/serialized for processing on this host, whether the volume has been processed to some degree by any host within a recent, specified period of time, whether the volume is currently being processed by this host, whether the volume has been retried the maximum number of times, and what the skip count is for the volume. These fields are used to select the volume for processing, as is explained later herein. While a volume is being processed, the MVT entry also contains the load on the channel paths to which the volume is connected.

The CCL is a control block used to record the current load placed on the channel paths by long running DFHSM applications. The CCL includes a table of 256 elements of 31 bits each. The CHPIDs are used as an index into the CCL table to determine the existing load on each channel path. Generally, as each volume is selected for processing by a long running application, the average load per channel path for the selected volume is added to the load value stored in the CCL for each channel path connected to the selected volume to update such as necessary. Similarly, at the end of volume processing, the same load that was previously added for the volume is subtracted from the load value for each of the channel paths connected to the volume. It should be understood that at CCL initialization and updating the CCL is serialized, altered and deserialized as is known in the art.

OPERATION OF THE INVENTION

The flow of the invention will now be described referring to FIGS. 3-7. Generally, SMS volumes are preferred for selection for processing over non-SMS volumes Also, SMS and non-SMS volumes may be selected during primary selection or during retry selection, which is described later. SMS volumes are thus first selected during primary SMS volume selection, then non-SMS volumes are selected during primary non-SMS volume selection, and then both SMS and non-SMS volumes are selected during retry selection. Either or both SMS and non-SMS volumes may be selected using channel path load balancing criteria, as will be described.

Figure 3:
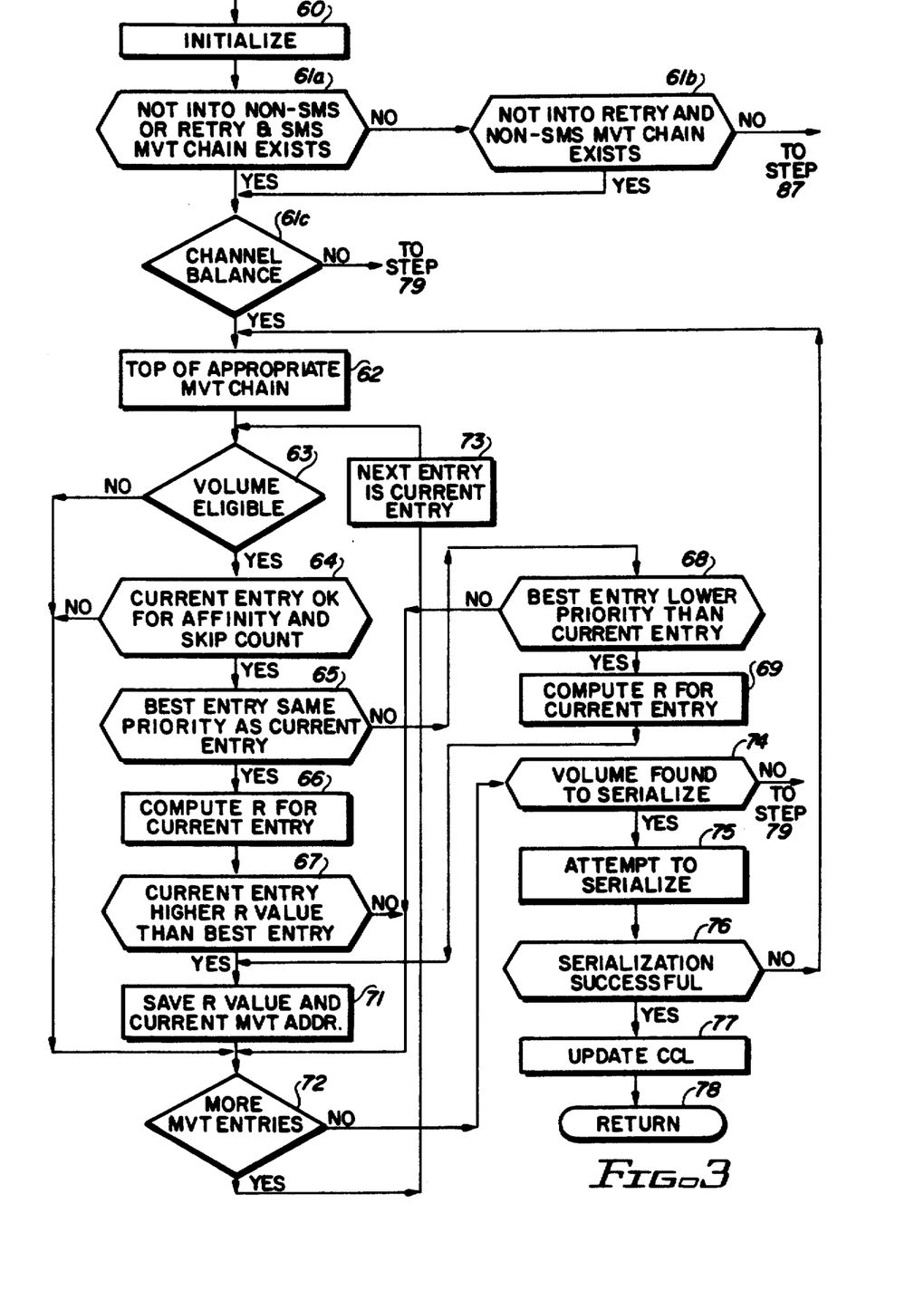
FIGS. 3-7 combine to form a flow chart of the invention.

The CCL is initialized when DFHSM is started. At step 60, the flow begins when a long running application begins and the necessary data structures are initialized using information from the control data structures. If the current application is the only DFHSM application currently active, the load values in the CCL for each CHPID are zeroed as no DFHSM load currently exists. If other DFHSM applications are currently active the CCL is not zeroed. Each volume entry in both the SMS MVT chain and the non-SMS MVT chain are initialized. If a volume is eligible for the current application (i.e. processing is required thereunder), the eligibility flag is set and processing flags are reset in the MVT. The CHPIDs are then retrieved from the system and placed in the MVT.

At steps 61a-61c, volume selection begins. Steps 61a-61c determine whether the last return out of the flow, if any, left off during primary SMS volume selection, primary non-SMS volume selection, or retry volume selection, and whether the channel path load balancing criteria of steps 62-78 are to be used. Such a determination allows a return to the proper step in the overall flow when the selection of yet another volume (since the last return out of the flow at steps 78, 84, or 104) is required. Step 61a determines whether primary SMS volume selection should be re-entered. Step 61b determines whether primary non-SMS volume selection should be re-entered. If neither are to be reentered, the flow is directed to retry volume selection at step 87. If primary volume selection is necessary, step 61c determines whether the respective type of primary volume processing (SMS or non-SMS) has been designated by the user to proceed according to the channel path load balancing criteria. If not, the flow is directed to step 79. If so, the flow continues at step 62.

In the following embodiment, it is assumed that channel path load balancing has been designated for primary SMS volume selection only. Thus, primary non-SMS volume selection will be described without such load balancing. The embodiment has been so chosen to allow for the description of primary volume selection according to both the channel path load balancing and non-load balancing criteria. It should be understood that a user may prefer to designate otherwise (e.g. to designate load balancing for both primary SMS volume selection and primary non-SMS volume selection).

If SMS is active and an SMS MVT chain exists, the selection of SMS volumes for the current application processing begins at step 62 at the top (beginning of the chain) of the SMS MVT chain. At step 63, the first entry in the chain is examined to determine if the volume with which it is associated is eligible for current application processing, as indicated by the bit (or flag) in the respective field for such previously mentioned. If the volume is not eligible for processing, the flow skips down to step 72 to begin the search to consider another SMS volume. If the volume is eligible for current application processing, the MVT entry is examined for host affinity at steps 64 and 67.

Primary SMS volume selection is prioritized according to host affinity. DFHSM can process volumes assigned to a specific host or volumes that can be processed on any host. The user may restrict or assign volumes to be processed by only a particular given host, referred to herein as host "affinity". For example, volume 52 can be assigned to either host 21 or host 22, or neither. Note that the term "assigned" here refers to the affinity (dedication) of a volume to a host, whereas the related art used the same term to refer to the actual selection of resources for the processing of a task. A problem could arise such that by processing an unassigned volume on a host first, the time window for periodic DFHSM processing on that host could expire before volumes having affinity to that host can be processed. Because unassigned volumes can be processed by another host, the selection of assigned volumes is preferred over unassigned volumes. DFHSM also counts the number of times a volume has failed serialization after being selected, known as the skip count. A volume which has failed serialization, for reasons such as its already being in use, is more likely to fail again than a volume attempting serialization for the first time. The selection of assigned volumes that have not previously been selected for processing by the current application is therefore preferred over those that have been selected but have failed serialization just once, which in turn is preferred over unassigned volumes that have not previously been selected for processing by the current application. All three of such aforementioned volumes are preferred over assigned volumes which have failed serialization more than once and unassigned volumes which have failed serialization one or more times. Thus, prioritization between any two volumes is accomplished by comparison of their respective affinities and skip counts.

During steps 62–72, the SMS MVT chain is examined entry by entry, each entry being examined once, continually comparing the current entry in the chain with that of the existing best entry of those previously examined during the current scan (i.e. during the current single run through the chain). The address of the best entry of those previously examined during the current scan is always saved in main memory for future comparisons with the remaining entries in the chain. Hereinafter, the term "entry" is used to refer to the volume associated with such entry and the term "best entry" is used to refer to the existing best entry.

At step 64 the affinity and skip count of the current entry, as previously described, is determined. If the current entry is assigned and has failed serialization more than once, or if the current entry is unassigned and has failed serialization one or more times, the flow skips to step 72. Such a finding indicates that the entry is of the lowest priority for selection and can only be selected for processing during retry (i.e. after the selection of all higher priority SMS and non-SMS volumes). At steps 65 and 68, the remaining entries are prioritized by comparison of the affinity and skip count of the best entry and the current entry.

At step 65, it is determined if the best entry and current entry are of the same priority. If not, at step 68, it is determined if the best entry is of lower priority than that of the current entry. If not again, the best entry is not changed and the flow skips to step 72. If the best entry is of lower priority than that of the current entry, some calculations are made and the current entry is saved as the best entry at steps 69 and 71. If, at step 65, the best entry and current entry are of the same priority, some calculations are made at step 66 to compare and determine at step 67 whether the current entry should be saved as the best entry, or whether the best entry should remain as is. If the current entry should remain as is, step 71 is skipped. When the current entry is the very first entry in the chain, or at least is the first entry in the chain to reach step 65, the flow proceeds to step 68 (i.e. the priorities are not the same) and then to step 69 (i.e. the priority of the highest priority entry is considered lower than that of the current entry).

At steps 66 and 69, identical calculations are made with respect to the current entry. Two factors are used to calculate a representative average channel load, or "R value", for the current entry. First, a load value associated with processing a volume under the current application is determined. The load values are arbitrary except that they are proportionally weighted according to the load actually caused by the processing of a volume under the current application. For DFHSM, full volume dump is of approximately twice the channel load intensity as volume migration and incremental backup. Thus, the load value associated with full volume dump is proportional to that for volume migration and incremental backup. In addition, the load value is weighted according to the effect of different DFDSS I/O buffer options on the loads. The load value is also used in the average load per channel field in the MVT. The other factor is the number of channel paths connected to each volume, as indicated in the MVT.

As stated previously, the average load per channel path for each volume is stored in the MVT. Such average load is determined by dividing the actual load by the number of channel paths to which the volume is connected. The sum of all such calculations for each channel path is the representative channel load, stored in the CCL as entry $CCL_I$ therein. The CCL entries are summed for each current volume according to the formula:

$$R = \frac{\sum_{i=1}^{n} \frac{C}{CCL_I}}{n} \quad (1)$$

where n is the number of channel paths to which a volume is connected and C is a constant such that:

$$\text{if } CCL_I = 0 \text{ then } \frac{C}{CCL_I} = 2C$$

and $$\text{if } CCL_{I+a} = 0 \text{ then } \frac{C}{CCL_{I+a}} = C$$

for $a = 1, 2, 3 \ldots$

More simply, for volumes connected to multiple channel paths having zero load, the first channel path having zero load is assigned a value twice the value of the constant in equation 1 and subsequent channel paths having zero load are assigned the value of the constant. The sum, R, for each volume is the representative average channel load for that volume across the respective connected channel paths. The volume having the highest R value is that having the "lowest" channel path load (i.e. according to the aforementioned formula, which may differ from the simple average of the load values) and is selected for processing. For example, the use of the representative average channel load results in a preference for the selection of the volume connected to the least active CHPID (i.e. even though the simple numerical average of the load values would have resulted in a selection tie). Also, the use of the representative average channel load results in a preference for the selection of volumes having the fewest number of connected but idle channel paths, thereby preserving the larger number of connected but idle channel paths for later use. For volumes having equal R values, the volume connected to the fewest number of channel paths is selected. Such a tiebreaker ensures that actual processing of the selected volume effects the fewest number of channels, thereby making it less likely that a volume selected later has only one channel and that channel is excessively busy.

At step 67, the R value calculated for the current entry is compared to that previously calculated for the best entry (at the time the best entry became such). As already mentioned, if the current entry has the higher R value, the current entry becomes the best entry. If the best entry has the higher R value, the best entry remains unchanged as step 71 is skipped. At step 69, the affinity and skip count of the entries has already indicated that the current entry becomes the best entry. At step 71, the MVT address and the R value of the current entry is saved as the new best entry.

Figure 4:
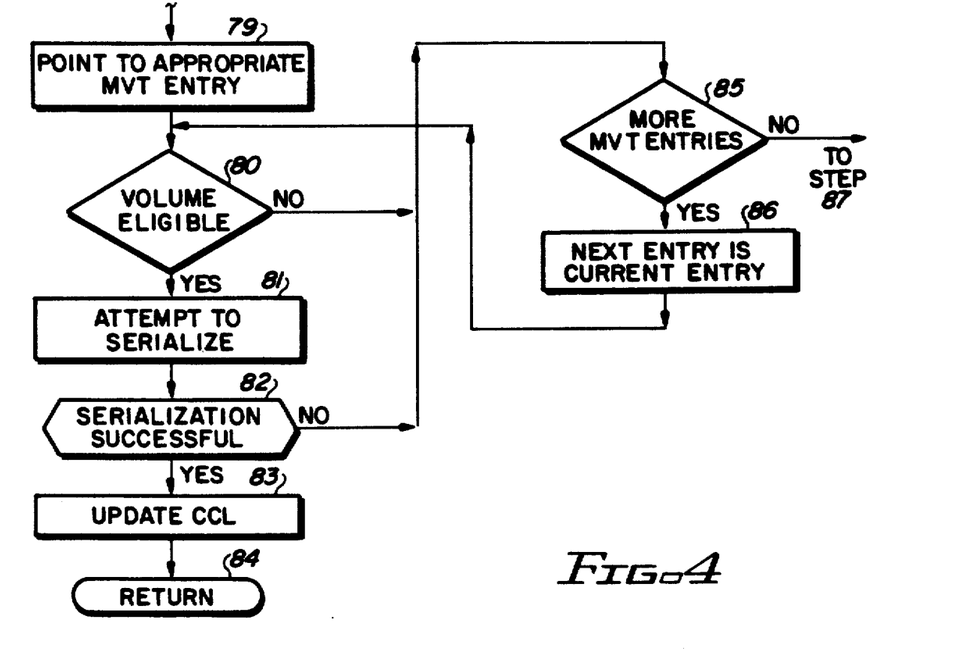

The existence of any remaining entries in the SMS MVT chain during the current scan is determined at step 72. If another such entry exists, it becomes the current entry at step 73 and the flow loops back to step 63. The "new" current entry is again compared to the saved highest priority entry as already described. The loops continue until all SMS MVT chain entires have been examined. When the end of the SMS MVT chain is reached, the flow jumps from step 72 to step 74. It is possible that the entire chain was scanned and no best entry was created. For example, there may be no entries in the chain which are eligible for processing for the current DFHSM application. Under such circumstances, the flow jumps from step 74 to step 79 to attempt to select a volume from the non-SMS MVT chain. However, if a best entry exists, serialization is attempted on the associated volume using the saved MVT address at step 75. Serialization is the reservation of resources, such as a volume, to permit actual processing of the selected volume.

If serialization is successful, the CCL is updated to reflect the added load resulting from processing of the newly selected volume at step 77. This includes calculating the average load value across the channel paths of the serialized volume, assuming that the load is distributed equally across all channel paths to which a volume is connected. This assumption may not always be accurate, but is simpler than monitoring the actual load distribution across the channel paths. The average load is added to the corresponding entries for each channel path in the CCL. The selected/serialized in the host flag is also set in the MVT to prevent the volume from being considered for subsequent selection. Finally, the MVT address of the selected volume is returned to the host for actual processing at step 78, thereby exiting the program.

If serialization is unsuccessful, the precise action taken depends upon the reason for failure. If serialization fails because not enough time has elapsed since the volume was last processed for this application, the processed in another host flag is set in the MVT to prevent consideration of the volume during subsequent selection.

DFHSM waits such times to avoid having one host process a volume under an application and then having another host needlessly reprocess that volume under the same application shortly thereafter. If serialization fails because the volume was already in use by another DFHSM application, the skip counter is incremented. In both cases, the saved R value and MVT address are cleared and the skip count for the volume is incremented, the flow is returned from step 76 to step 62 for subsequent SMS volume selection.

Figure 5:
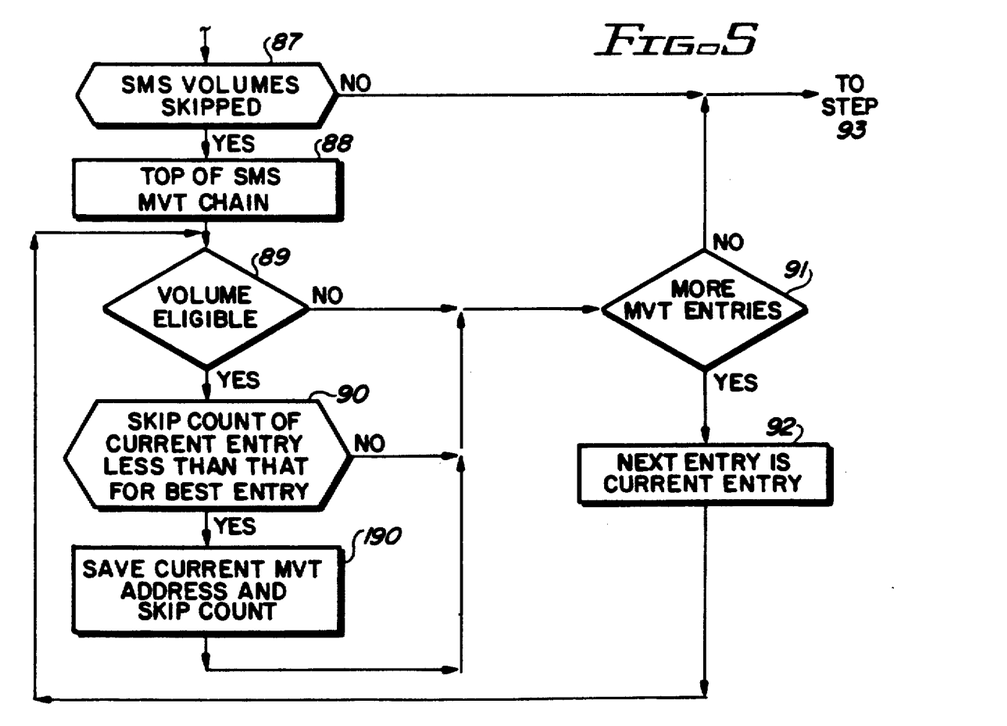

If a SMS volume is successfully serialized, and the selection of yet another volume is required, the program is re-entered at step 61a and continues from where processing last left off to select from among the remaining SMS volumes and so on. Once step 79 is reached, the process of selection continues from among the non-SMS volumes in the non-SMS MVT chain. Recall that among non-SMS volumes management criteria are selected at the time of data entry or volume insertion (ADDVOL) This means that the order of entry into the non-SMS MVT chain (i.e. the sequence therein) is the order of attempted volume selection. Thus, at step 79, the first entry in the non-SMS MVT chain becomes the current entry therein.

At step 80, the eligibility of the current entry is determined, similar to the determination made at step 63. If the current entry is eligible, serialization is attempted at step 81 and the flow continues through steps 82–84 similar to that of steps 75–78. If a non-SMS volume is successfully serialized, and the selection of yet another volume is required, the program is re-entered at step 61a and again continues from where processing last left off to select from among the remaining non-SMS volumes and so on. If the current entry is not eligible for the current application, or if serialization is unsuccessful, the flow jumps to steps 85 and 86 which are analogous to steps 72 and 73.

The existence of any remaining entries in the non-SMS MVT chain during the current scan is determined at step 85. If another such entry exists, it becomes the current entry and the flow eventually loops back to step 80. The loops continue until all non-SMS MVT chain entries have been examined. It is possible that the entire chain was scanned and no volume was serialized. When the end of the non-SMS MVT chain is reached, the flow jumps from step 85 to step 87 to attempt to select a volume during retry volume selection.

Figure 6:
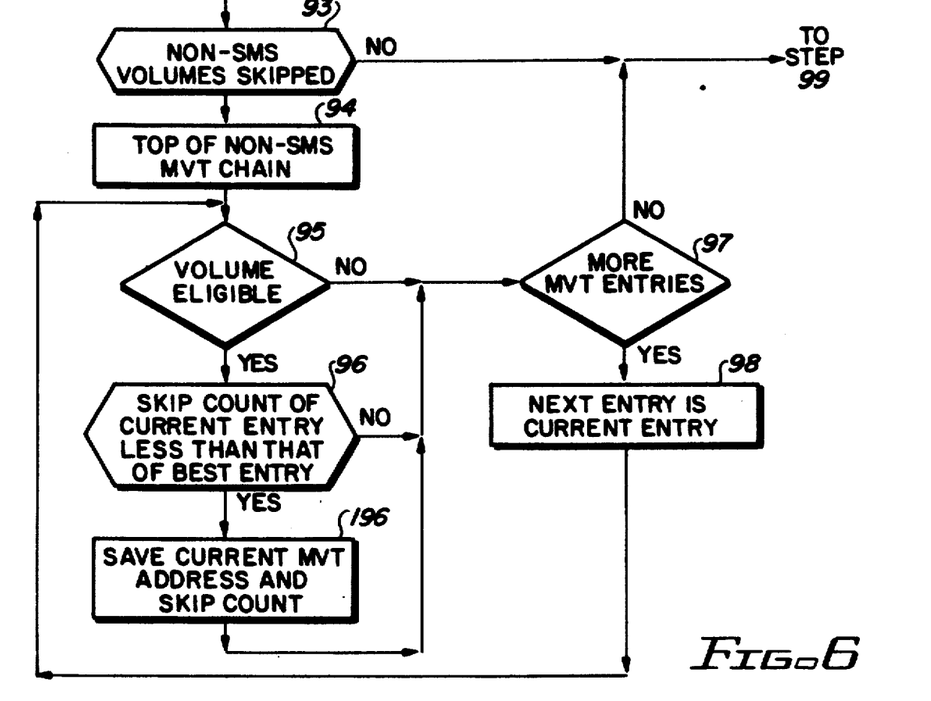

At step 87, retry volume selection begins to attempt such selection from those volumes not previously serialized. During retry volume selection, the SMS volumes are scanned before non-SMS volumes, but the selection of neither is preferred over that of the other. The remaining volume, SMS or non-SMS, that has been skipped the fewest number of times is selected. Step 87 begins the process of retry selection by determining if any SMS volumes have been skipped. If not, the flow jumps to step 93 to determine if any non-SMS volumes have been skipped.

Retry selection proceeds by examining each successive skipped entry in the respective MVT chain. At step 88, the first such entry in the SMS MVT chain becomes the current entry. The eligibility of the entry for processing under the current application is determined at step 89. If the current entry is ineligible, the flow skips to step 91 as there is no need to save any information about the entry. If the current entry is eligible, the MVT address and the skip count of the entry are saved as the best entry for later use at step 190.

As the remainder (if any) of the SMS MVT chain is scanned, the skip count of the current entry is continually compared at step 90 to that of the remaining entry having the lowest skip count (previously saved). The entry having the lowest skip count is always the one entry for which the information is again saved as the best entry. Steps 91 and 92 are analogous to steps 72-73 and steps 85-86 in determining whether the flow loops back to step 89. At step 93, the skipped non-SMS entries are compared to the saved information, beginning with that from the skipped SMS entries. Steps 94-98 and 196 are analogous to steps 88-92 and 190.

Figure 7:
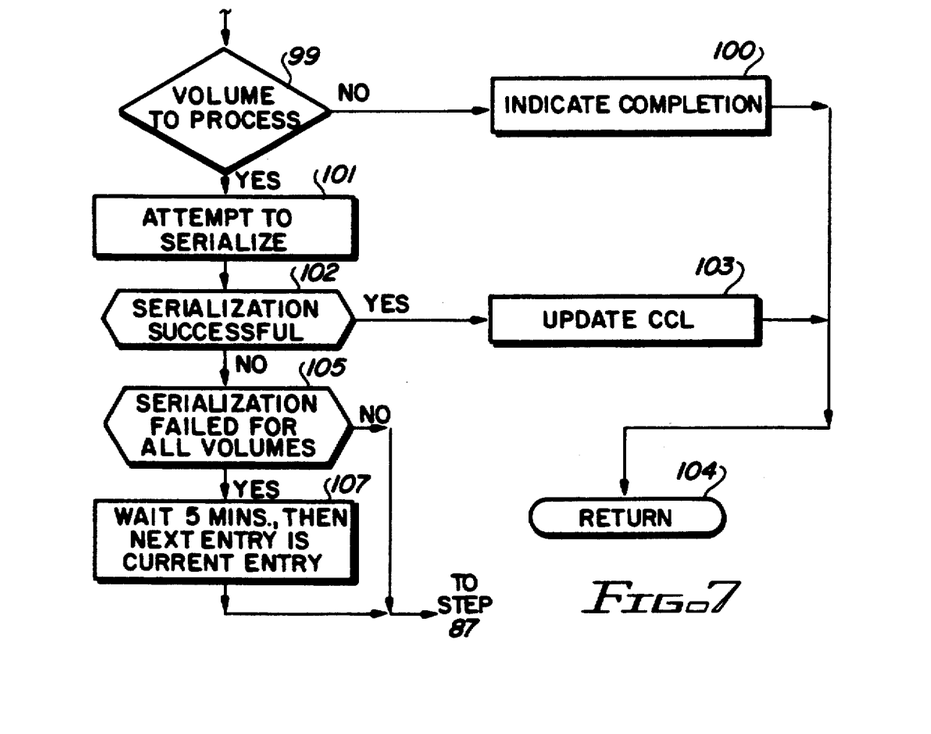

The existence of a retry volume for selection is determined at step 99. If no retry volume has been selected, control is returned to the calling host with an indication that the selection program has completed. If a retry volume has been selected, serialization is attempted at step 101. If serialization is successful, the CCL is updated at step 103 and control is returned to the calling host as in steps 77-78 or steps 83-84. If the selection of yet another volume is required, the program is re-entered at step 61a and again continues from where processing last left off to select from among the remaining retry volumes and so on. If serialization is unsuccessful, the skip count for selected volume is incremented and the flow jumps from step 102 to step 105. At step 105, it is determined if any volumes are remaining for selection. The criteria here is whether all volumes available have failed serialization. "All volumes available" refers to those volumes not already serialized and eligible for processing. Having "failed serialization" refers to one such failure since the last time step 107 was reached, unless step 107 has not been reached before for the current application, and fewer than ten such failures. In the preferred embodiment, the maximum number of retries is ten. If volumes remain to be selected, the flow loops to step 87 and continues. If no such volumes exist, a five-minute delay is invoked at step 107 and the flow is again looped to step 87. Eventually, no volumes may remain for selection according to the aforementioned criteria and control is returned to the host via steps 100 and 104.

Figure 8:
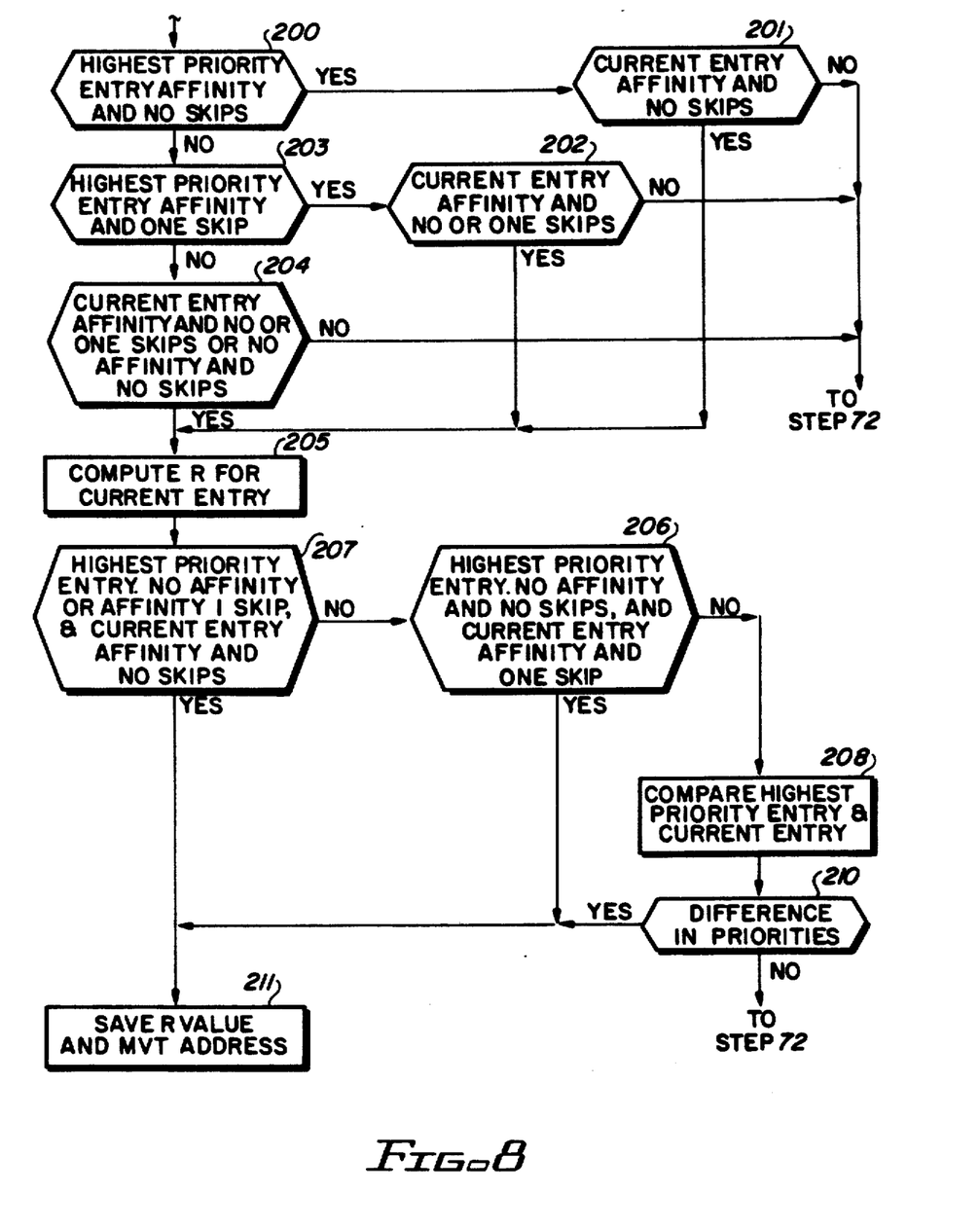
FIG. 8 is a more specific embodiment of some of the logic shown in FIG. 3.

Referring to FIG. 8, a more specific embodiment of the logic described in FIG. 3 will be detailed. Steps 200-211 can be substituted for steps 65-71. The embodiment can be fully implemented using SELECT statements which permit the combination of several IF/THEN branches into a single statement, as is known in the art.

Each of the branching steps shown in FIG. 8 is conditioned upon the affinity or skip count of the current entry or best entry or some combination thereof. The condition in step 200 is whether the best entry is assigned and has a skip count of zero. The condition in step 201 is whether the current entry is assigned and has a skip count of zero. The condition in step 202 is whether the current entry is assigned with a skip count of zero or assigned with a skip count of one. The condition in step 203 is whether the best entry is assigned with a skip count of one. The condition in step 204 is whether the current entry is assigned with skip count of zero, assigned with a skip count of one, or unassigned with a skip count of zero. Step 205 is analogous to steps 66 and 69. The condition in step 206 is whether the best entry is unassigned with a skip count of zero and the current entry is assigned with a skip count of one. The condition in step 207 is whether the best entry is assigned with a skip count of one or unassigned, and the current entry is assigned with a skip count of zero. Steps 208 and 210 are analogous to step 67. Step 211 is analogous to step 71. A trial run through each combination of the relevant affinities and skip counts (zero, one, or more) in the best entry and the current entry yields the same results for both FIG. 3 and FIG. 8.

While the invention has been particularly shown and described with reference to preferred embodiments thereof, it will be understood by those skilled in the art that various changes in form and details may be made therein without departing form the spirit and scope of the invention. For example, in an alternative to the process described, the user could designate that the channel path load balancing criteria of steps 62-73 also be used to select non-SMS volumes instead of that shown at steps 79-86. Also, steps 62-73 and steps 79-86 could be combined to eliminate the preference for the selection of SMS volumes over non-SMS volumes. Similarly, each individual criteria for preference of the selection of a specific type of volume could be eliminated. Accordingly, the invention disclosed herein is to be limited only as specified in the following claims.

What is claimed is:

1. A machine-implemented method of balancing the loads on I/O channel paths during application processing in a digital computer, the digital computer including a plurality of channel paths connected between at least one host processor and a plurality of data storage devices upon which a plurality of data storage volumes are stored, the processing resulting in the transmission of signals as a unique load on each channel path, the method comprising the machine-executed steps of: selecting one of the volumes as the next volume to be processed under at least one of a plurality of applications, the plurality of applications including relatively short running applications and relatively long running applications, said selecting one of the volumes including:
- continuously monitoring the load on each channel path;
- calculating the average load on the channel paths between at least one host processor and the data storage devices upon which a volume is stored resulting only from the relatively long running applications for each one of the volumes under consideration for selection as the next volume to be processed; and
- selecting the one of the volumes from among those under consideration for selection which has the lowest calculated average load as the next volume to be processed; and processing the selected one of the volumes.

2. The method of claim 1 wherein the volumes under consideration for selection as the next volume to be processed during the step of calculating are only those volumes for which processing is for relatively long running applications.

3. The method of claim 2 wherein the volumes under consideration for selection as the next volume to be processed during the step of calculating are only those volumes having affinity to at least one host processor.

4. The method of claim 1 wherein the volumes under consideration for selection as the next volume to be processed during the step of calculating are only those volumes having affinity to at least one host processor of the volumes for which processing is for relatively long running applications.

5. The method of claim 1 wherein the step of selecting the one of the volumes includes selecting the volume having the fewest channel paths, between at least one host processor and the data storage devices upon which the volume is stored, as the next volume to be processed among a plurality of volumes having equal calculated average load.

6. The method of claim 1 further comprising the step of cyclically repeating the steps of selecting one of the volumes as the next volume to be processed and processing the selected one of the volumes.

7. A machine-implemented method of balancing the loads on I/O channel paths during application processing in a digital computer, the digital computer including a plurality of channel paths connected between at least one host processor and a plurality of data storage devices upon which a plurality of data storage volumes are stored, the processing resulting in the transmission of signals as a unique load on each channel path, the method comprising the machine-executed steps of:
- selecting one of the volumes as the next volume to be processed under at least one of a plurality of applications, the plurality of applications including relatively short running applications and relatively long running applications, said selecting one of the volumes including:
- monitoring the load on each channel path:
- calculating the average load on the channel paths between at least one host processor and the data storage devices upon which a volume is stored resulting only from the relatively long running applications for each one of the volumes under consideration for selection as the next volume to be processed, the volumes under consideration for selection as the next volume to be processed being only those volumes having affinity to at least one host processor of those volumes for which processing is for relatively long running applications; and
- selecting the one of the volumes from among those under consideration which has the lowest calculated average load as the next volume to be processed;
- processing the selected one of the volumes; and cyclically repeating the steps of selecting one of the volumes as the next volume to be processed and processing the selected one of the volumes.

8. The method of claim 7 wherein the step of selecting the one of the volumes includes selecting the volume having the fewest channel paths, between at least one host processor and the data storage devices upon which the volume is stored, as the next volume to be processed among a plurality of volumes having equal calculated average load.

9. The method of claim 7 wherein the step of cyclically repeating continues until all volumes under consideration are selected and then begins selecting from those volumes not having affinity to at least one host processor of those volumes for which processing is for relatively long running applications.

10. The method of claim 7 wherein the step of calculating the average load for each volume is the calculation of a representative average channel load and further comprises the machine-executed steps of:
- for each channel path between at least one host processor and the data storage devices upon which a volume is stored having a non-zero load, calculating a representative channel load;
- for a first channel path between at least one host processor and the data storage devices upon which a volume is stored having a zero load, setting a representative channel load to a first predetermined number;
- for each subsequent channel path between at least one host processor and the data storage devices upon which a volume is stored having a zero load, setting a representative channel load to a second predetermined number, the first predetermined number being greater than the second predetermined number; and
- averaging the representative channel loads of the channel paths to obtain a representative average channel load.

11. A computer system including means for balancing the loads on I/O channel paths during application processing, the computer system including a plurality of channel paths connected between at least one host processor and a plurality of data storage devices upon which a plurality of data storage volumes are stored, the processing resulting in the transmission of signals as a unique load on each channel path, the computer system comprising:
- means for selecting one of the volumes as the next volume to be processed under at least one of a plurality of applications, the plurality of applications including relatively short running applications and relatively long running applications, said means for selecting one of the volumes including:
- means for continuously monitoring the load on each channel path;
- means for calculating the average load on the channel paths between at least one host processor and the data storage devices upon which a volume is stored resulting only from relatively long running applications for each one of the volumes under consideration for selection as the next volume to be processed, the means for calculating connected to the means for continuously monitoring; and means for selecting the one of the volumes from among those under consideration for selection which has the lowest calculated average load, the means for selecting connected to the means for calculating; and means for processing the selected one of the volumes.

12. The computer system of claim 11 wherein the volumes under consideration for selection as the next volume to be processed by the means for calculating are only those volumes for which processing is for relatively long running applications.

13. The computer system of claim 12 wherein the volumes under consideration for selection as the next volume to be processed by the means for calculating are only those volumes having affinity to at least one host processor.

14. The computer system of claim 11 wherein the volumes under consideration for selection as the next volume to be processed by the means for calculating are only those volumes having affinity to at last one host processor of the volumes for which processing is for relatively long running applications.

15. The computer system of claim 11 wherein the means for selecting the one of the volumes includes means for selecting the volume having the fewest channel paths, between at least one host processor and the data storage devices upon which the volume is stored, as the next volume to be processed among a plurality of volumes having equal calculated average load.

16. The computer system of claim 11 further comprising means for cyclically repeating selecting one of the volumes as the next volume to be processed and processing the selected one of the volumes.

* * * * *